July 31, 1962 V. R. SIMPSON ETAL 3,047,077
COMBINATION GAUGE WHEEL AND COLTER
Filed May 2, 1960 2 Sheets-Sheet 1
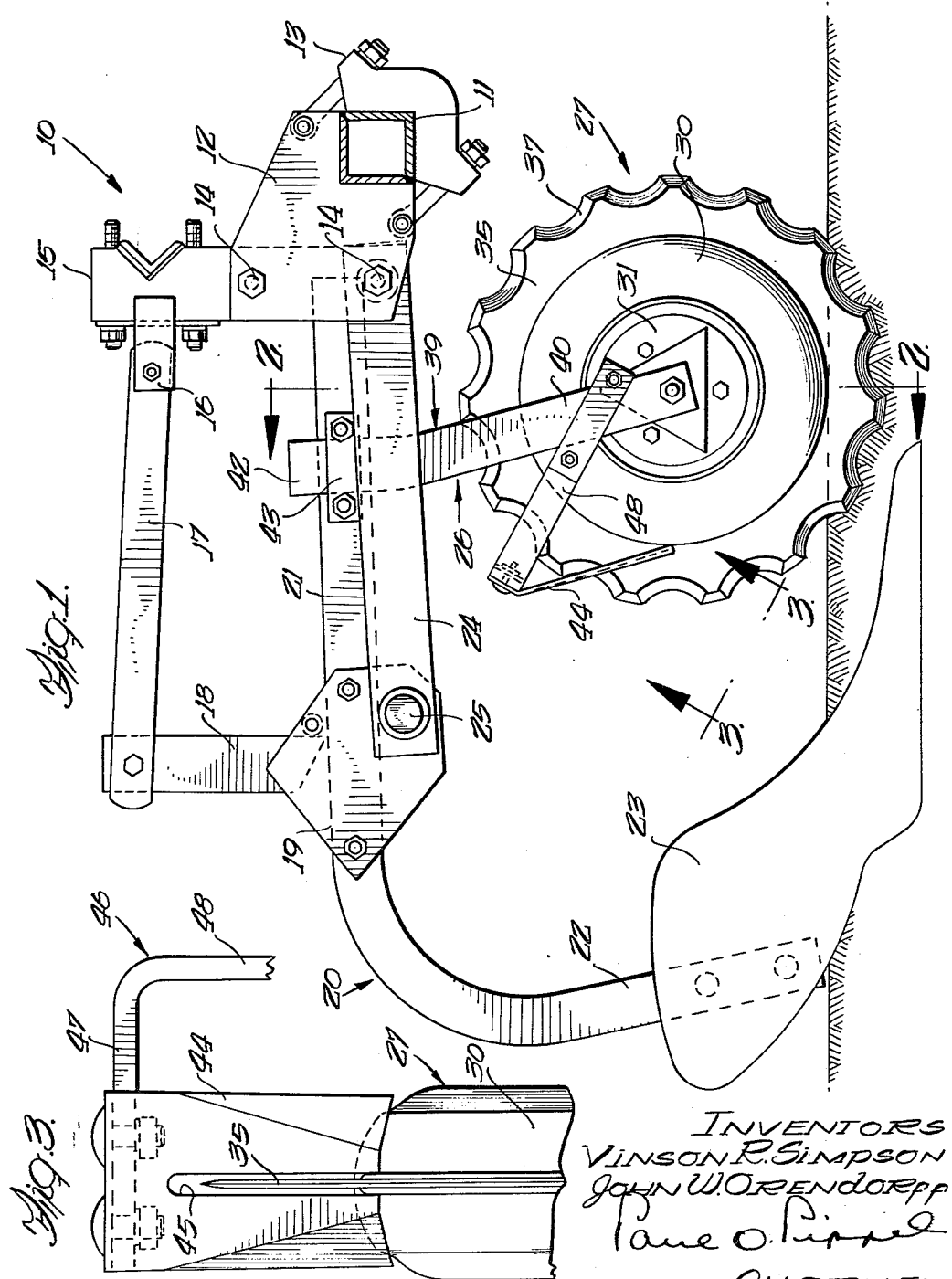
INVENTORS
VINSON R. SIMPSON
JOHN W. ORENDORFF
Paul O. Pippel
ATTORNEY July 31, 1962  V. R. SIMPSON ETAL  3,047,077
COMBINATION GAUGE WHEEL AND COLTER
Filed May 2, 1960  2 Sheets-Sheet 2
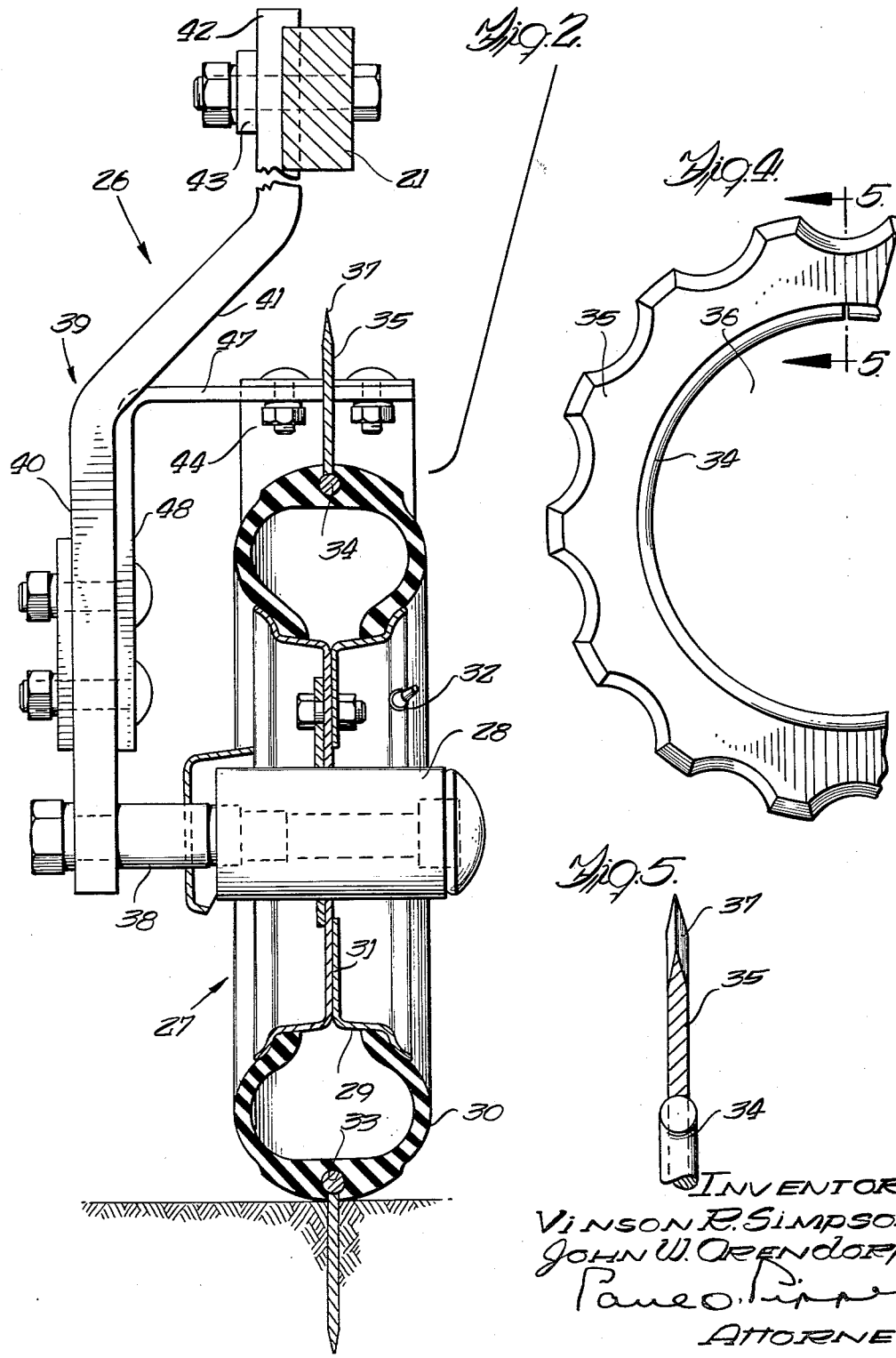
INVENTORS
VINSON R. SIMPSON
JOHN W. ORENDORFF
Pablo Pippel
ATTORNEY

United States Patent Office 3,047,077
Patented July 31, 1962

3,047,077
COMBINATION GAUGE WHEEL AND COLTER
Vinson R. Simpson, Forest Park, and John W. Orendorff, Downers Grove, Ill., assignors to International Harvester Company, Chicago, Ill., a corporation of New Jersey
Filed May 2, 1960, Ser. No. 26,353
5 Claims. (Cl. 172—519)

This invention relates to earth working devices and the like and particularly to agricultural implements. More specifically the invention concerns a novel gauge wheel and colter unit adapted to combine the functions of a gauge wheel and a colter while occupying a minimum of space on the implement.

Implements closely coupled to tractors frequently present the problem of finding room to accommodate colters, gauge wheels and the like. The problem becomes more complicated when an implement such as a lister or middle buster requires both a colter and a gauge wheel. These devices are independently attached to the implement frame, and where space is at a premium it is often necessary to sacrifice one or the other.

An object of the invention is the provision of a novel article of manufacture comprising a pneumatic tired wheel having an annular blade imbedded in its periphery.

Another object of the invention is the provision of a combined gauge wheel and colter assembly which requires no more space than a separate gauge wheel or a separate colter.

Another object of the invention is the provision of a combination gauge wheel and colter for agricultural implements comprising a pneumatic tired gauge wheel and a colter blade in the form of an annulus surrounding the periphery of the wheel, the tire being expandable to firmly grip the inner periphery of the annulus and deflatable for easy disassembly therefrom.

Other objects and advantages of the invention will become clear from the following detailed description when read in conjunction with the accompanying drawings wherein:

FIGURE 1 is a view in side elevation, partly in section, of a typical middle buster assembly showing the mounting means by which it is connected to a tool bar such as is carried by a tractor, and having mounted thereon a combination gauge wheel and colter incorporating the features of this invention;

FIGURE 2 is an enlarged sectional elevation taken on the line 2—2 of FIGURE 1;

FIGURE 3 is an enlarged detail viewed on the line 3—3 of FIGURE 1;

FIGURE 4 is an enlarged elevation of a portion of the colter of this invention, and FIGURE 5 is a section taken on the line 5—5 of FIGURE 4.

The numeral 10 designates a middle buster unit mounted upon a tool bar 11 carried by a tractor or the like and includes a plate 12 mounted on the tool bar by a clamp 13 and having secured thereto by bolts 14 an upright 15.

Although the details of construction by which the lister or middle buster unit is mounted on the tool bar 11 form no part of this invention, it may be understood that a pair of uprights 15 are provided to which are secured rearwardly extending lugs 16, only one being shown in the drawings. To each of the lugs 16 is pivotally connected the forward end of a link 17, it being understood that a pair of such links 17 are provided and converge rearwardly. The rear ends of links 17 are pivotally connected to the upper end of a post 18 affixed to a plate 19 secured to a middle buster beam 20 having a generally horizontal forward portion 21 and a downwardly extending standard portion 22 upon which is mounted a middle buster bottom 23.

Another pair of laterally spaced lower links 24 are pivotally mounted at their forward ends upon bolts 14 and at their rear ends upon a shaft 25 carried by one or more plates 19.

The combination gauge wheel and colter unit of this invention is designated by the numeral 26 and is in the form of a wheel 27 comprising a hub 28 and a rim 29 upon which is mounted an inflatable pneumatic tire 30 of rubber or other flexible material. Hub 28 and rim 29 are connected by a web 31. Air under pressure is supplied to the tire 30 through a conventional valve structure indicated at 32.

The tire 30 is provided with a central peripheral groove 33 to seat an annular bead 34, circular in cross-section, forming the inner periphery of a colter disk blade 35 having a relatively large central opening 36 therein substantially equal to the diameter of the groove 33 in the tire 30.

Blade 35 constitutes an annulus surrounding the tire 30 and having a sharpened scalloped edge 37 adapted to penetrate the ground. While the portion of the disk 35 projecting radially from the tire 30 penetrates the ground, the tire engages the ground surface and functions as a gauge wheel to determine the depth of operation of the middle buster bottom 23.

Assembly of the colter element 35 with the pneumatic tire 30 is facilitated by deflating the tire until the bead 34 is seated in groove 33 whereupon the tire is again expanded to press firmly against the bead 34 and hold the annular disk blade 35 thereto.

The wheel 27 is rotatably mounted upon a shaft 38 received in hub 28. One end of the shaft 38 is carried at the lower end of a standard 39 having a vertical section 40 to the lower end of which shaft 38 is secured, and an inwardly bent portion 41 terminating in another vertical section 42 secured by a clamp 43 to one side of the horizontal portion 21 of the middle buster beam 20.

A scraper is provided in the form of a plate 44 having a central slot 45 adapted to receive the colter blade 35 and having its lower edges in operative engagement with the surface of the tire 30. The plate 44 is secured to a bracket 46 having a transverse portion 47 and a portion 48 bent at right angles thereto and secured to the standard 39.

It is believed that the construction and operation of the combination colter and gauge wheel of this invention will be clearly understood from the foregoing description. It should be likewise understood that the invention has been described in its preferred embodiment only, and that modifications may be made therein without departing from the spirit of the invention or the scope of the appended claims.

What is claimed is:

1. An article of manufacture comprising a wheel having thereon an inflatable tire, said tire having a centrally disposed peripheral groove, and a disk having a central opening adapted to receive said peripheral groove therein, the inner diameter of said disk being substantially equal to the inner diameter of said groove.

2. The invention set forth in claim 1, wherein the inner periphery of the opening in said disk is thickened to form a bead having substantially the same conformation as said groove.

3. The invention set forth in claim 2, wherein said bead is substantially circular in cross-section.

4. A combination gauge wheel and colter comprising an earth penetrating blade in the form of an annulus having a relatively large central opening, a wheel having a rim and a pneumatic tire thereon having a central peripheral groove and adapted to be received in said opening, and an annular bead formed on the inner edge of the annulus and receivable in said groove to form an integral association with the tire, said tire being inflatable to snugly engage said bead.

5. A combination gauge wheel and colter comprising an earth penetrating blade in the form of an annulus having a relatively large central opening, a wheel having a rim and a pneumatic tire thereon having a peripheral groove and adapted to be received in said opening with the inner edge of the annulus receivable in the groove, the tire being inflatable to snugly engage said inner edge.

References Cited in the file of this patent

UNITED STATES PATENTS

| | | |
|---|---|---|
| 336,475 | Crossley | Feb. 16, 1886 |
| 922,405 | Dreyer | May 18, 1909 |
| 1,041,350 | Reidinger | Oct. 15, 1912 |
| 2,601,464 | Tanke | June 24, 1952 |
| 2,757,596 | Adels | Aug. 7, 1956 |
| 2,888,993 | Dunning | June 2, 1959 |

FOREIGN PATENTS

| | | |
|---|---|---|
| 650,627 | France | Sept. 15, 1928 |
| 15,002 | Great Britain | June 12, 1897 |